(12) United States Patent
Chen et al.

(10) Patent No.: US 10,801,720 B2
(45) Date of Patent: Oct. 13, 2020

(54) POROUS MEDIUM PREMIXING COMBUSTOR

(71) Applicant: Wuhan University of Science and Technology, Wuhan, Hubei Province OT (CN)

(72) Inventors: Yuanyuan Chen, Wuhan (CN); Xuecheng Xu, Wuhan (CN); Bin Li, Wuhan (CN); Benwen Li, Wuhan (CN); Zhu He, Wuhan (CN); Yawei Li, Wuhan (CN); Xiong Liang, Wuhan (CN)

(73) Assignee: Wuhan University of Science and Technology, Wuhan (CN)

( * ) Notice: Subject to any disclaimer, the term of this patent is extended or adjusted under 35 U.S.C. 154(b) by 127 days.

(21) Appl. No.: 16/204,696

(22) Filed: Nov. 29, 2018

(65) Prior Publication Data

US 2019/0353346 A1    Nov. 21, 2019

(30) Foreign Application Priority Data

May 15, 2018    (CN) .......................... 2018 1 04664353

(51) Int. Cl.
*F23D 14/66*    (2006.01)
*B01F 3/02*    (2006.01)
(Continued)

(52) U.S. Cl.
CPC ................ *F23D 14/66* (2013.01); *B01F 3/02* (2013.01); *B01F 5/0691* (2013.01);
(Continued)

(58) Field of Classification Search
CPC .... B01F 3/02; B01F 15/00915; B01F 5/0691; B01F 2215/0086; F23D 14/14;
(Continued)

(56) References Cited

U.S. PATENT DOCUMENTS

| 2,095,065 A | * | 10/1937 | Hays | ..................... | F23C 99/006 |
| | | | | | 431/7 |
| 5,080,577 A | * | 1/1992 | Bell | ..................... | F23C 99/006 |
| | | | | | 431/10 |

(Continued)

*Primary Examiner* — Alfred Basichas
(74) *Attorney, Agent, or Firm* — Leydig, Voit & Mayer, Ltd.

(57) ABSTRACT

A porous-medium premixing combustor is provided, which includes: an air-fuel gas mixer, a combustor body, a thermocouple, an ignition electrode, and a detecting electrode. The combustor body includes a casing connected to the air-fuel gas mixer; an outer and an inner burner-block, wherein the outer burner-block and the casing are connected, forming a square chamber, and the inner burner-block is provided inside the square chamber, with a via hole communicating with a pipe; and a mixed gas distributing plate, an ordered porous plate, a small-pore foamed ceramic plate, and a big-pore foamed-ceramic plate sequentially provided along an axis direction of the via hole of the inner burner-block. The thermocouple is provided at the casing and extends into the square chamber. The ignition electrode is provided close to an end of the big-pore foamed-ceramic plate. The detecting electrode is provided close to an exit end of the big-pore foamed-ceramic plate.

10 Claims, 4 Drawing Sheets

(51) Int. Cl.
*B01F 5/06* (2006.01)
*B01F 15/00* (2006.01)
*F23C 1/06* (2006.01)
*F23D 14/02* (2006.01)
*F23D 14/14* (2006.01)
*F23D 14/70* (2006.01)

(52) U.S. Cl.
CPC .......... *B01F 15/00915* (2013.01); *F23C 1/06* (2013.01); *F23D 14/02* (2013.01); *F23D 14/14* (2013.01); *F23D 14/70* (2013.01); *B01F 2215/0086* (2013.01); *F23N 2225/20* (2020.01); *F23N 2227/02* (2020.01); *F23N 2229/00* (2020.01); *F23N 2239/04* (2020.01)

(58) Field of Classification Search
CPC .......... F23D 14/66; F23D 14/70; F23D 14/02; F23D 14/16; F23D 2203/105; F23C 1/06; F23N 2239/04; F23N 2229/00; F23N 2225/20; F23N 2227/02
See application file for complete search history.

(56) References Cited

U.S. PATENT DOCUMENTS 5,141,432 A * 8/1992 Bell .................. F23C 6/047
                                                  431/10
5,160,254 A * 11/1992 Bell .................. F23C 6/047
                                                  431/326

* cited by examiner

POROUS MEDIUM PREMIXING COMBUSTOR

CROSS-REFERENCE TO RELATED APPLICATIONS

This application claims priority to Chinese Patent Application No. CN201810466435.3, filed on May 15, 2018 with the Chinese Patent Office and entitled "Porous Medium Premixing Combustor", the content of which is herein incorporated by reference in its entirety.

TECHNICAL FIELD

The present disclosure relates to the technical field of premixing combustion, particularly to a porous medium premixing combustor.

BACKGROUND OF THE INVENTION

With the development of society and ever-decreasing fossil energies such as coal and petroleum, people are increasingly aware of broadening energy utilization and saving energy and reducing emission. Currently in our country, a main combustion manner is space combustion featured by free flame, with a series of defects such as emission of more nitrogen oxides caused by a too high local flame temperature, a large volume occupied, low combustion efficiency, and incapability of combusting low-calorific-value gases.

In recent years, the porous medium combustion technology, as a novel and unique combustion technology, has advantages of high combustion efficiency, cleanliness and non-pollution, good combustion stability, and remarkably broadened lean-burn limit, and thus attracts much attention from all walks. A dispersion effect of porous bodies enables a premixed gas to be dispersed in various chambers to combust in a flameless manner. Compared with conventional premixed combustion, the porous medium combustion is a highly efficient heat-regenerative combustion technology dispensed with auxiliary peripheral condition of energy. Meanwhile, radiation heating of the high-temperature porous medium to an upstream premixed fuel can achieve superadiabatic combustion, function to balance the temperature and stabilize the flame, and avoid generation of nitrogen oxides due to an elevated local temperature. In addition, the porous medium combustion technology has significant advantages in using low-calorific-value (poor-quality) fuels (blast-furnace gas, organic waste gas, etc.). As the porous medium combustion technology is integrated with energy conservation, emission reduction, and environmental protection, it has huge potential for energy conservation and emission reduction when applied to industries such as metallurgy, machinery, chemistry, ceramics, and food.

However, the porous medium combustion technology has not been widely applied in industrial production due to various limitations. According to reports, porous medium combustors that have been applied in industry are mostly limited to the field of heating at low temperatures such as papermaking, textile, and drying, while studies on porous medium combustors for the field of heating at moderate and high temperatures mostly focus on experimental studies, and have not been widely applied in industry yet. The field of heating at moderate and high temperatures is the key to industrial production, and is the most important in energy consumption and pollutant emission. Therefore, it is urgently necessary to develop a porous medium combustor suitable for the field of heating at moderate and high temperatures.

The porous medium combustors are generally premixing-type combustors, and a few of them employ diffusion combustion. At present, common porous medium combustors are mostly applied to the field of heating at low temperatures (temperatures below 400° C.). Due to a relatively low flame temperature, a basic combustion system therefor is relatively simple, with a basic idea that air and coal gas, after being premixed, are subjected to uniform air distribution through an air distribution plate, and directly enter an entrance of a porous medium with a big pore size without being preheated. However, as the porous medium combustion technology is being popularized to the field of heating at moderate and high temperatures, arrangement of such porous medium layer with a single pore size is no longer applicable, with specific defects represented as follows:

(1) It is impossible to predict and effectively prevent backfire (there are unstable phenomena such as flame quenching, backfire, and flame deflection):

A conventional open-flame premixing combustor prevents backfire by maintaining a premixed gas at a certain velocity value within the combustor. While a premixing-type porous medium combustor prevents backfire in two ways. In a first way, by providing a porous medium with a small pore size, backfire is prevented using a flame-quenching effect of small pores; in a second way, backfire is prevented by maintaining the premixed gas at a certain flow rate value. However, due to construction of the porous medium combustor, this velocity value is much smaller than a velocity value required for the conventional combustors to prevent backfire. For a porous medium combustor for heating at low temperatures, the porous medium is in a relatively low temperature environment due to a low heat load per unit area of the porous medium (heat released by the fuel gas per unit area), therefore, the porous medium material is not easily to be damaged under high temperatures, and less heat refluxes through the porous medium to the uncombusted premixed gas, so that backfire still can be prevented even if great fluctuation occurs to a combustion condition. However, when the porous medium combustor is applied to the field of heating at moderate and high temperatures, the porous medium as a whole is in a relatively high temperature environment (locally exceeding 1400° C. or even higher when a high-calorific-value gas is combusted) due to a relatively high heat load per unit area of the porous medium, and more heat refluxes through the porous medium to the uncombusted premixed gas. In the event of long-term operation or a sudden change in the combustion condition, there may be a situation where a pore structure of the porous medium material is damaged under a high temperature, especially pores of a small-pore porous medium are more easily to be damaged, and heat refluxing to the uncombusted premixed gas is suddenly increased. When such situation is aggravated continuously, a phenomenon that an electrode can detect a flame signal but backfire occurs to the combustor takes place. Therefore, a control idea of determining whether there is a backfire or not simply dependent on detecting flame by an electrode is no longer applicable.

As the flame temperature increases, a medium effective radiation coefficient will increase by times of third power of the temperature, and reinforced heat regenerating is likely to cause backfire.

(2) It is impossible to predict and monitor use status of the porous medium material in real-time:

The flame of the porous medium combustor is present inside the porous medium. In long-term use, situations such as aging of the material and damage of the pore structure will be inevitably encountered. When the small-pore structure is damaged, a part of the flame will appear in a small-pore area. The appearance of the flame in the small-pore area further aggravates the damage of the small-pore area. When the material is damaged to a certain extent, the small-pore area loses a barrier function for preventing backfire, and backfire occurs to the combustor, which is even worse when it is applied to the field of heating at moderate and high temperatures. Therefore, it is necessary to monitor a damage situation of the small-pore porous medium material in use. When the damage develops to a certain extent, the porous medium material needs to be replaced in time to avoid safety accidents. However, such situation is not taken into consideration or monitored for existing porous medium combustors, seriously affecting use effects.

(3) When air and a fuel gas are preheated by the combustor, it is impossible to monitor a real-time operating condition (there is no premixing temperature detection device):

Regardless of conventional open-flame combustors or porous medium combustors, current premixing combustors do not preheat air or a coal gas in order to prevent occurrence of backfire. However, theoretically, using waste heat of smoke to preheat air and the coal gas is a best way to recycle energy. When air or the fuel gas is preheated, control over a preheating temperature is of great importance to premixing combustion. Since the premixed gas is also heated by heat refluxed by the porous medium in a preheating area, then the premixed gas receives both heating energy from preheating and heating energy refluxed by the porous medium, and the two parts of energy are associated with each other. The preheating can increase the heat refluxed by the porous medium, and the increase in the refluxed heat can in turn enhance the preheating effect. Once the heat is superimposed such that the temperature of the gas reaches a certain value inside a premixing chamber, even a backfire explosion will be caused, and a safety accident will occur. In an actual process, the gas is generally preheated by using a heat exchanger, and a heat source is combusted waste gas, while the current design level of heat exchangers generally cannot achieve precise control over the temperature, and the combusted waste gas may also fluctuate at any time. All these factors will cause the gas preheated by the heat exchanger to be unable to reach or exceed a design temperature, and a backfire explosion accident occurs. For diffusion combustion, a sudden change in the preheating temperature will raise the temperature of the flame in the combustion zone of the porous medium, and accelerate the damage of the porous medium. Therefore, it is necessary to monitor sudden changes of the gas preheating condition that inevitably occur in the actual process.

To sum up, the current porous medium combustors need to be improved, particularly when the porous medium combustors are applied in the field of heating at moderate and high temperatures, a set of more optimized device is required.

SUMMARY OF THE INVENTION

The present disclosure is achieved as follows:

A porous medium premixing combustor, comprising:

an air-fuel gas mixer having an air inlet and a coal gas inlet;

a combustor body, wherein the combustor body includes a casing, an outer burner block, and an inner burner block, the casing is connected to the air-fuel gas mixer through a pipe, the outer burner block and the casing are fixedly connected, and form a square chamber; the inner burner block is provided inside the square chamber and fixedly connected to the casing, the inner burner block has a via hole communicating with the pipe; the combustor body further includes a mixed gas distributing plate, an ordered porous plate, a small-pore foamed ceramic plate, and a big-pore foamed ceramic plate sequentially provided inside the square chamber of the outer burner block along an axis direction of the via hole of the inner burner block;

a thermocouple provided at the casing, wherein an end of the thermocouple extends into the square chamber for monitoring a temperature of the mixed gas before entering the ordered porous plate;

an ignition electrode, provided close to one end of the big-pore foamed ceramic plate through an inclined hole of the outer burner block, and used to ignite air and fuel gas at an end face of the big-pore foamed ceramic plate; and a detecting electrode, inserted in an exit end of the big pore foamed ceramic plate through a horizontal hole of the outer burner block, and used to detect an electric ion signal of a flame.

BRIEF DESCRIPTION OF DRAWINGS

In order to more clearly illustrate technical solutions of embodiments of the present disclosure, accompanying drawings which are needed for description of the embodiments will be introduced briefly below. It should be understood that the accompanying drawings below merely show some embodiments of the present disclosure, therefore, they should not be considered as limiting the scope, and a person ordinarily skilled in the art still can obtain other relevant accompanying drawings according to these accompanying drawings, without inventive effort.

Reference signs: 100—porous medium premixing combustor; 101—air inlet; 103—coal gas inlet; 105—combustor body; 107—casing; 109—outer burner block; 111—inner burner block; 113—pipe; 115—mixed gas distributing plate; 117—ordered porous plate; 119—small-pore foamed ceramic plate; 121—big-pore foamed ceramic plate; 123—thermocouple; 125—ignition electrode; 127—detecting electrode; 129—first block body; 131—first steel outer housing; 133—second block body; 135—second steel outer housing; 137—guiding cone; 139—baffle; 141—through hole; 143—first section hole; 145—second section hole.

DETAILED DESCRIPTION OF THE INVENTION

In order to make the objects, technical solutions, and advantages of the embodiments of the present disclosure much clearer, below the technical solutions in the embodiments of the present disclosure will be described clearly and completely in conjunction with the accompanying drawings in the embodiments of the present disclosure, apparently, some but not all embodiments of the present disclosure are described. Generally, components in the embodiments of the present disclosure, as described and shown in the accompanying drawings herein, may be arranged and designed in various different configurations. Therefore, the detailed description below of the embodiments of the present disclosure provided in the accompanying drawings is not intended to limit the scope of protection of the present disclosure claimed, but merely illustrates chosen embodiments of the present disclosure. On the basis of the embodiments of the present disclosure, all of other embodiments, obtained by a person ordinarily skilled in the art without paying inventive efforts, should fall within the scope of protection of the present disclosure.

It should be noted that similar reference signs and letters represent similar items in the following accompanying drawings, therefore, once a certain item is defined in one accompanying drawing, it is not needed to be further defined and explained in subsequent accompanying drawings.

In the description of the embodiments of the present disclosure, it should be indicated that orientational or positional relationships indicated by terms such as "center", "upper", "lower", "left", "right", "vertical", "horizontal", "inner", and "outer" are based on orientational or positional relationships as shown in the accompanying drawings, or orientational or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limiting the present disclosure. Besides, terms such as "first", "second", and "third" are merely for distinguished description, but should not be construed as indicating or implying relative importance.

In the description of the embodiments of the present disclosure, it further should be indicated that unless otherwise specified and defined explicitly, terms "provide", "mount", "join", and "connect" should be construed in a broad sense. For example, it may be fixed connection, and also may be detachable connection, or integrated connection; it may be mechanical connection, and also may be electrical connection; it may be direct connection, and also may be indirect connection through an intermediate medium, or inner communication between two elements. For a person ordinarily skilled in the art, specific meanings of the above-mentioned terms in the present disclosure can be understood according to specific circumstances.

In the present disclosure, unless otherwise specified and defined explicitly, a first feature being on or under a second feature may include the first feature and the second feature being in direct contact, and also may include the first feature and the second feature being not in direct contact but being in contact through another feature therebetween. Moreover, the first feature being on, above or over the second feature includes the first feature being directly above or not directly above the second feature, or merely means the level of the first feature being higher than that of the second feature. The first feature being under, below or beneath the second feature includes the first feature being directly below or not directly below the second feature, or merely means the level of the first feature being lower than that of the second feature.

An object of the present disclosure is to provide a porous medium premixing combustor, which can achieve efficient and clean combustion of fuels, be adapted to combustion of gases with different calorific values, and meanwhile can effectively prevent backfire, facilitate flame monitoring, predict and monitor use status of a porous medium material in real time, and have a function of effectively monitoring an operating condition of combustion in a situation of preheating air and a fuel gas and so on.

In a preferred embodiment of the present disclosure, the outer burner block includes a first block body formed by casting a light-weight refractory castable material and a first steel outer housing, the first block body is fixed to the first steel outer housing through an anchor nail, and the first steel outer housing covers a bottom wall and a part of an outer wall of the first block body.

Further, in a preferred embodiment of the present disclosure, the inner burner block includes an internal second block body formed by casting a light-weight high-strength castable material and an outer second steel outer housing, the second block body is fixed to the second steel outer housing through an anchor nail, and the second steel outer housing covers a bottom wall and a part of an outer wall of the second block body.

Further, in a preferred embodiment of the present disclosure, the mixed gas distributing plate includes a guiding cone and a baffle, the baffle is mounted to the inner burner block through the brackets, a center line of the baffle overlaps an axis of the via hole, and the guiding cone is welded to a center of the baffle.

Further, in a preferred embodiment of the present disclosure, the baffle is a steel plate, and the guiding cone is formed by rolling a steel plate.

Further, in a preferred embodiment of the present disclosure, the ordered porous plate is a light-weight high-strength cast plate having a plurality of through holes uniformly distributed at intervals, each through hole has a first section hole and a second section hole, the first section hole is provided close to the mixed gas distributing plate, and the first section hole is a straight-through hole, and the second section hole, with a gradually increasing diameter, is a divergent hole.

Further, in a preferred embodiment of the present disclosure, the small-pore foamed ceramic plate and the big-pore foamed ceramic plate have a pore equivalent diameter of 0.4~5 mm, a porosity between 0.6 and 0.9, and the number of pores in the range of 10~60 PPI, and pores of the big-pore foamed ceramic plate are larger than pores of the small-pore foamed ceramic plate.

Further, in a preferred embodiment of the present disclosure, the big-pore foamed ceramic plate is a composite corundum or silicon carbide or zirconium oxide porous medium plate, and the big-pore foamed ceramic plate has the number of pores of 10~50 PPI and the porosity of 0.6~0.9; the small-pore foamed ceramic plate is a composite corundum or silicon carbide or zirconium oxide porous medium plate, and the small-pore foamed ceramic plate has the number of pores of no less than 50 PPI and the porosity of 0.6~0.9.

Further, in a preferred embodiment of the present disclosure, the outer burner block and a furnace wall, the outer burner block and the inner burner block, and the inner burner block and the air-fuel gas mixer are in bolted connection therebetween, respectively, facilitating detaching and replacing a porous medium material.

Further, in a preferred embodiment of the present disclosure, the ordered porous plate, the small-pore foamed ceramic plate, and the big-pore foamed ceramic plate are tightly attached together, and a space between each of them and an inner wall of the square chamber is filled with silica wool.

Beneficial effects of the above solutions are as follows:

The present disclosure provides a porous medium premixing combustor, including: the air-fuel gas mixer, the combustor body, the thermocouple, the ignition electrode, and the detecting electrode, wherein the air-fuel gas mixer has the air inlet and the coal gas inlet. The combustor body includes the casing, the outer burner block, and the inner burner block, the casing is connected to the air-fuel gas mixer through the pipe, the outer burner block and the casing are fixedly connected, and form the square chamber; the inner burner block is provided inside the square chamber and fixedly connected to the casing, the inner burner block has a via hole communicating with the pipe; the combustor body further includes the mixed gas distributing plate, the ordered porous plate, the small-pore foamed ceramic plate, and the big-pore foamed ceramic plate sequentially provided inside the square chamber of the outer burner block along an axis direction of the via hole of the inner burner block. The casing well ensures installation and operation of various parts. The mixed gas distributing plate can guide the mixed gas to be uniformly distributed inside a whole cavity passage, avoiding concentrated distribution, such that a combustion flame is distributed in the whole porous medium, and a flame temperature is uniform. The ordered porous plate not only can ensure uniform distribution of the mixed gas entering the small-pore-size porous medium, but also can effectively avoid occurrence of backfire after the small-pore-size porous medium is damaged. The thermocouple is provided at the casing, and an end of the thermocouple extends into the square chamber for monitoring the temperature of the mixed gas before entering the ordered porous plate. The thermocouple is mounted for monitoring the temperature of the mixed gas before entering the ordered porous plate, to determine whether the combustor operates normally, in order to avoid occurrence of backfire. According to data measured with the thermocouple in combination with a corresponding control system, the following may be achieved: (1) backfire is effectively predicted and prevented; (2) ignition and operation condition are monitored through cooperation of the temperature and the flame signal; (3) control over combustion of gases with different calorific values inside the porous medium can be adapted to; (4) use status of the porous medium material can be monitored and diagnosed, and service life of the porous medium material can be predicted; (5) combustion condition can be effectively monitored in a situation of preheating air-fuel gas, and operation parameters of a preheating device and in a heating space are fed back and adjusted. Meanwhile, the ignition electrode is provided close to one end of the big-pore foamed ceramic plate through an inclined hole of the outer burner block, and is used to ignite air and the fuel gas at an end face of the big-pore foamed ceramic plate. The ignition electrode is a safe and reliable ignition mode. The detecting electrode is inserted in an exit end of the big-pore foamed ceramic plate through a horizontal hole of the outer burner block, and is used to detect an electric ion signal of a flame, wherein presence of a signal indicates normal combustion of the fuel gas, and absence of a signal indicates flameout of the fuel gas or occurrence of backfire.

To sum up, the porous medium premixing combustor provided in embodiments of the present disclosure can achieve efficient and clean combustion of fuels, be adapted to combustion of gases with different calorific values, and meanwhile can effectively prevent backfire, facilitate flame monitoring, predict and monitor use status of the porous medium material in real time, and have a function of effectively monitoring the operating condition of combustion in a situation of preheating air and the fuel gas and so on.

Figure 1:
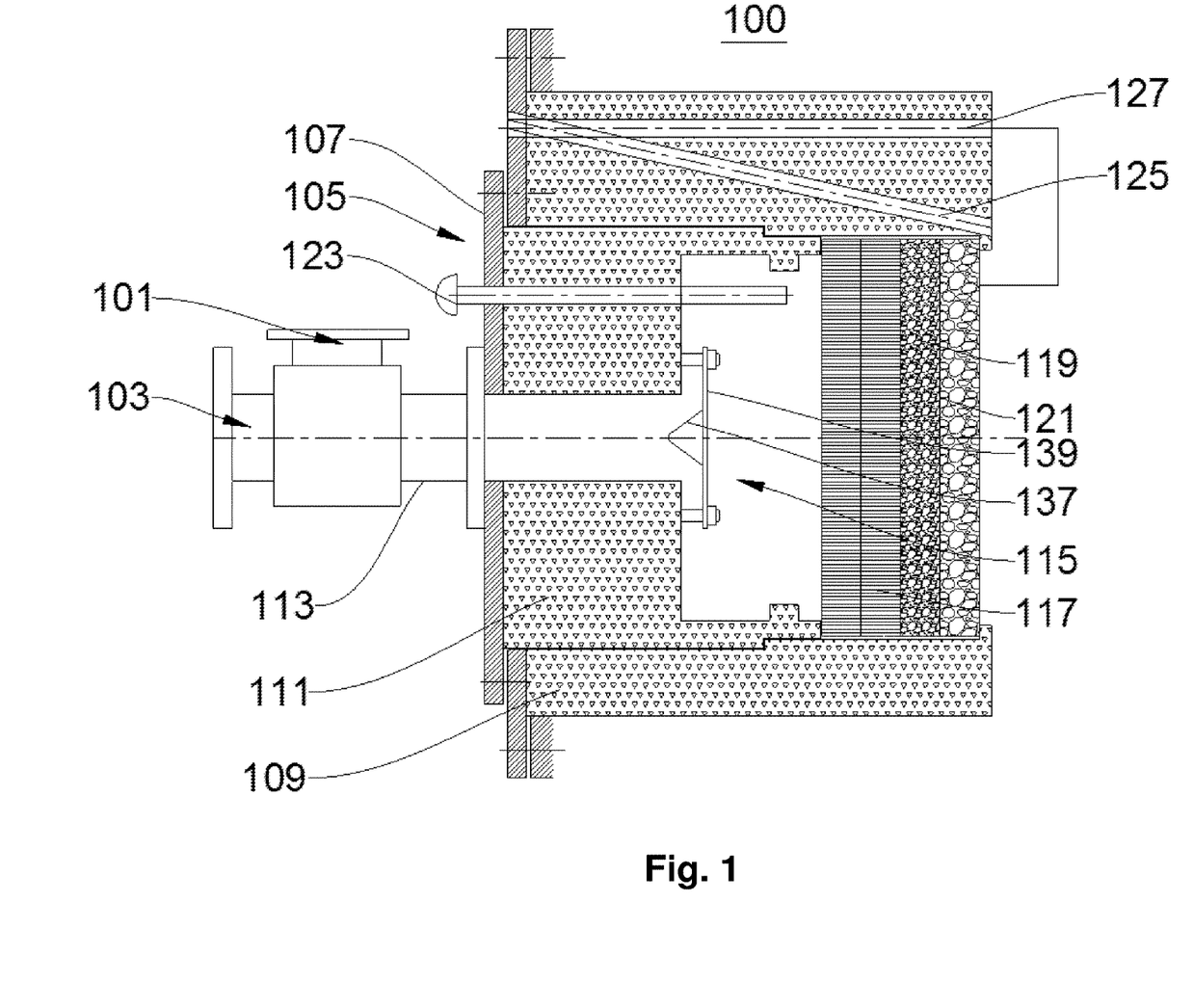
FIG. 1 is a structural schematic diagram of a porous medium premixing combustor provided in an embodiment of the present disclosure.

FIG. 1 is a structural schematic diagram of a porous medium premixing combustor 100 provided in the present embodiment. Referring to FIG. 1, the present embodiment provides a porous medium premixing combustor 100, including an air-fuel gas mixer, a combustor body 105, a thermocouple 123, an ignition electrode 125, and a detecting electrode 127.

Referring to FIG. 1 again, in the present embodiment, the air-fuel gas mixer has an air inlet 101 and a coal gas inlet 103. Air and a coal gas are delivered into the air-fuel gas mixer respectively through the air inlet 101 and the coal gas inlet 103 according to a certain equivalent ratio, and delivered into the combustor body 105 through a pipe 113.

Referring to FIG. 1 again, in the present embodiment, the combustor body 105 includes a casing 107, an outer burner block 109, and an inner burner block 111. The casing 107 is connected to the air-fuel gas mixer through the pipe 113. The outer burner block 109 and the casing 107 are fixedly connected, and form a square chamber communicating with the pipe 113. The inner burner block 111 is provided inside the square chamber and fixedly connected to the casing 107. The inner burner block 111 has a via hole communicating with the pipe 113. The combustor body 105 further includes a mixed gas distributing plate 115, an ordered porous plate 117, a small-pore foamed ceramic plate 119, and a big-pore foamed ceramic plate 121 sequentially provided inside the square chamber of the outer burner block 109 along an axis direction of the via hole of the inner burner block 111. The casing 107 well ensures installation and operation of various parts. The mixed gas distributing plate 115 can guide a mixed gas to be uniformly distributed inside a whole cavity passage, avoiding concentrated distribution, such that a combustion flame is distributed in the whole porous medium, and a flame temperature is uniform. The ordered porous plate 117 not only can ensure uniform distribution of the mixed gas entering the small-pore-size porous medium, but also can effectively avoid occurrence of backfire after the small-pore-size porous medium is damaged.

Referring to FIG. 1 again, in the present embodiment, the thermocouple 123 is provided at the casing 107, and an end of the thermocouple 123 extends into the square chamber for monitoring a temperature of the mixed gas before entering the ordered porous plate 117. The thermocouple 123 is mounted for monitoring the temperature of the mixed gas before entering the ordered porous plate 117, to determine whether the combustor operates normally, in order to avoid occurrence of backfire. According to data measured with the thermocouple 123 in combination with a corresponding control system, the following may be achieved: (1) backfire is effectively predicted and prevented; (2) ignition and operation condition are monitored through cooperation of the temperature and a flame signal; (3) control over combustion of gases with different calorific values inside the porous medium can be adapted to; (4) use status of the porous medium material can be monitored and diagnosed, and service life of the porous medium material can be predicted; (5) combustion condition can be effectively monitored in a situation of preheating air-fuel gas, and operation parameters of a preheating device and in a heating space are fed back and adjusted.

Meanwhile, the ignition electrode 125 is provided close to one end of the big-pore foamed ceramic plate 121 through an inclined hole of the outer burner block 109, and is used to ignite air and the fuel gas at an end face of the big-pore foamed ceramic plate 121. The ignition electrode 125 is a safe and reliable ignition mode. The detecting electrode 127 is inserted in an exit end of the big-pore foamed ceramic plate 121 through a horizontal hole of the outer burner block 109, and is used to detect an electric ion signal of a flame, wherein presence of a signal indicates normal combustion of the fuel gas, and absence of a signal indicates flameout of the fuel gas or occurrence of backfire.

To sum up, the air inlet is connected to an exit of a premixer by mounting a flange. Air and the coal gas are delivered into the combustor after being mixed in the air-fuel gas mixer according to a certain equivalent ratio. The premixed gas passes through the casing 107 and the via hole of the inner burner block 111, and is blocked and guided by the mixed gas distributing plate 115 at a terminal end of the passage to be diffused to the cavity all around. After passing by the distributing plate, the mixed gas is further subjected to air distribution through the ordered porous plate 117. Then, the mixed gas passes through the foamed ceramic plate, and is ignited by the ignition electrode 125 at the terminal end. After the ignition, flame front moves upstream and is stabilized inside the big-pore foamed ceramic. As the combustion being performed, the temperature of the porous medium gradually increases. Due to the strong thermal conduction and thermal radiation capabilities of the porous medium, thermal energy generated by the combustion is transmitted to the upstream porous medium, such that the small-pore foamed ceramic plate 119 is heated, and then fresh premixed gas is preheated through convection and radiation heat exchange. After the premixed gas is preheated, the combustion temperature and efficiency are further improved, and a low-calorific-value gas can be directly combusted. Meanwhile, after temperature data measured by the thermocouple 123 is analyzed with a special database, whether there is a backfire tendency, whether the porous medium material is damaged, whether the preheating situation of air and the fuel gas is suitable and so on can be predicted and determined. Therefore, the porous medium premixing combustor 100 provided in the embodiment of the present disclosure can achieve efficient and clean combustion of fuels, and be adapted to combustion of gases with different calorific values, and meanwhile can effectively prevent backfire, facilitate flame monitoring, predict and monitor use status of the porous medium material in real time, and have a function of effectively monitoring combustion conditions in a situation of preheating air and the fuel gas and so on.

It should be indicated that in other embodiments of the present disclosure, the coal gas also may be other gas fuels, for example, natural gas, coke oven gas, blast-furnace gas, and it is not limited in the embodiments of the present disclosure.

Figure 2:
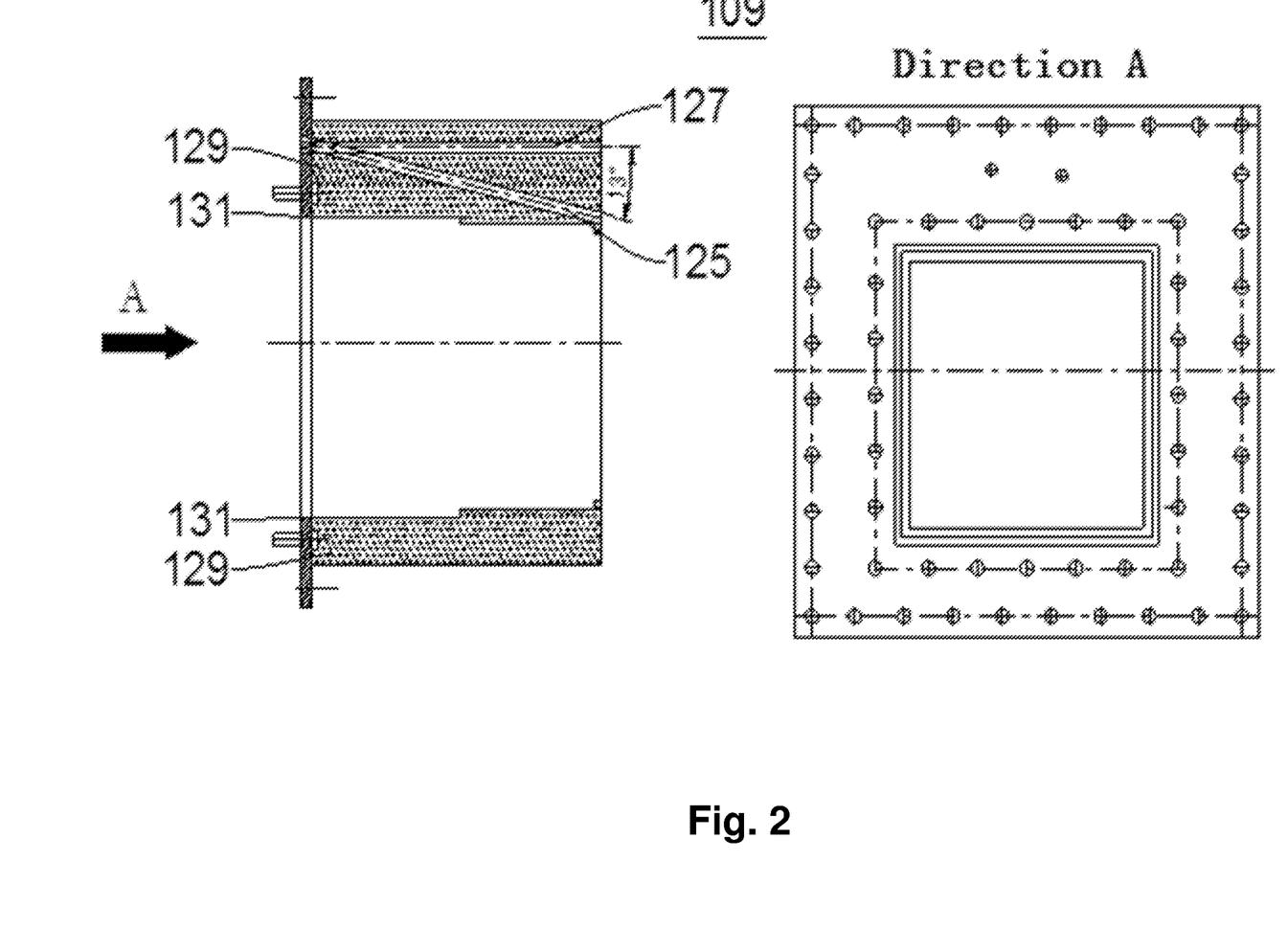
FIG. 2 is a structural schematic diagram of an outer burner block provided in an embodiment of the present disclosure.

FIG. 2 is a structural schematic diagram of the outer burner block 109 provided in the present embodiment. Referring to FIG. 1 and FIG. 2, in the present embodiment, the outer burner block 109 includes a first block body 129 formed by casting a light-weight refractory castable material and a first steel outer housing 131, the first block body 129 is fixed to the first steel outer housing 131 through an anchor nail, and the first steel outer housing 131 covers a bottom wall and a part of an outer wall of the first block body 129. The first steel outer housing 131 wraps a bottom portion and a part of side faces of the burner block, serving a supporting and reinforcing function. An inner chamber of the outer burner block 109 decreases progressively in three levels, such that it is convenient to mount or detach the foamed ceramic plates, the ordered porous plate 117, the mixed gas distributing plate 115, and the inner burner block 111.

Figure 3:
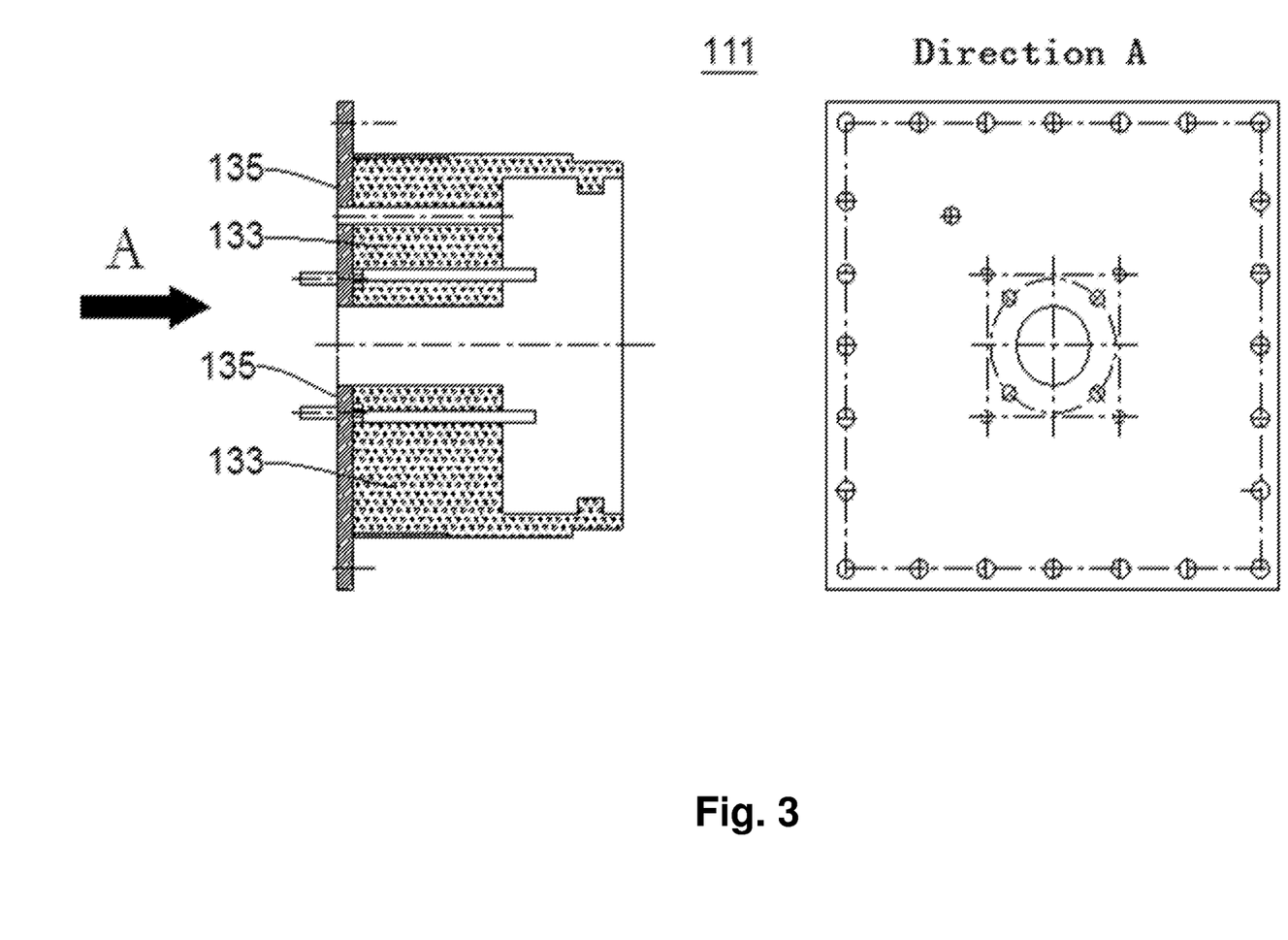
FIG. 3 is a structural schematic diagram of an inner burner block provided in an embodiment of the present disclosure.

FIG. 3 is a structural schematic diagram of the inner burner block 111 provided in the present embodiment. Referring to FIG. 1 and FIG. 3, in the present embodiment, the inner burner block 111 includes an internal second block body 133 formed by casting a light-weight high-strength castable material and an outer second steel outer housing 135, the second block body 133 is fixed to the second steel outer housing 135 through an anchor nail, and the second steel outer housing 135 covers a bottom wall and a part of an outer wall of the second block body 133. The second steel outer housing 135 covers at a bottom portion and a part of side faces of the inner burner block 111, serving a supporting and reinforcing function thereto. It is matched with the inner chamber of the outer burner block 109 in size, presenting a two-level structure. Moreover, a mixed gas inlet is mounted in a center of the inner burner block 111 and the casing 107 and communicates with the via hole. There are four brackets on a base for mounting the mixed gas distributing plate 115.

Referring to FIG. 1 again, in the present embodiment, the mixed gas distributing plate 115 includes a guiding cone 137 and a baffle 139, the baffle 139 is mounted to the inner burner block 111 through the brackets, a center line of the baffle 139 overlaps an axis of the via hole, and the guiding cone 137 is connected to a center of the baffle 139 by welding. The mixed gas distributing plate 115 enables a mixed gas from the coal gas pipe 113 to be distributed to the cavity all around, and guides the mixed gas to be uniformly distributed inside the whole cavity passage, avoiding concentrated distribution, such that a combustion flame is distributed in the whole porous medium, and the flame temperature is uniform.

As a preferred solution, in the present embodiment, the baffle 139 is a steel plate, and the guiding cone 137 is formed by rolling a steel plate. Of course, in other embodiments of the present disclosure, materials of the baffle 139 and the guiding cone 137 also may be selected according to requirements, and no limitation is made in the embodiments of the present disclosure.

Figure 4:
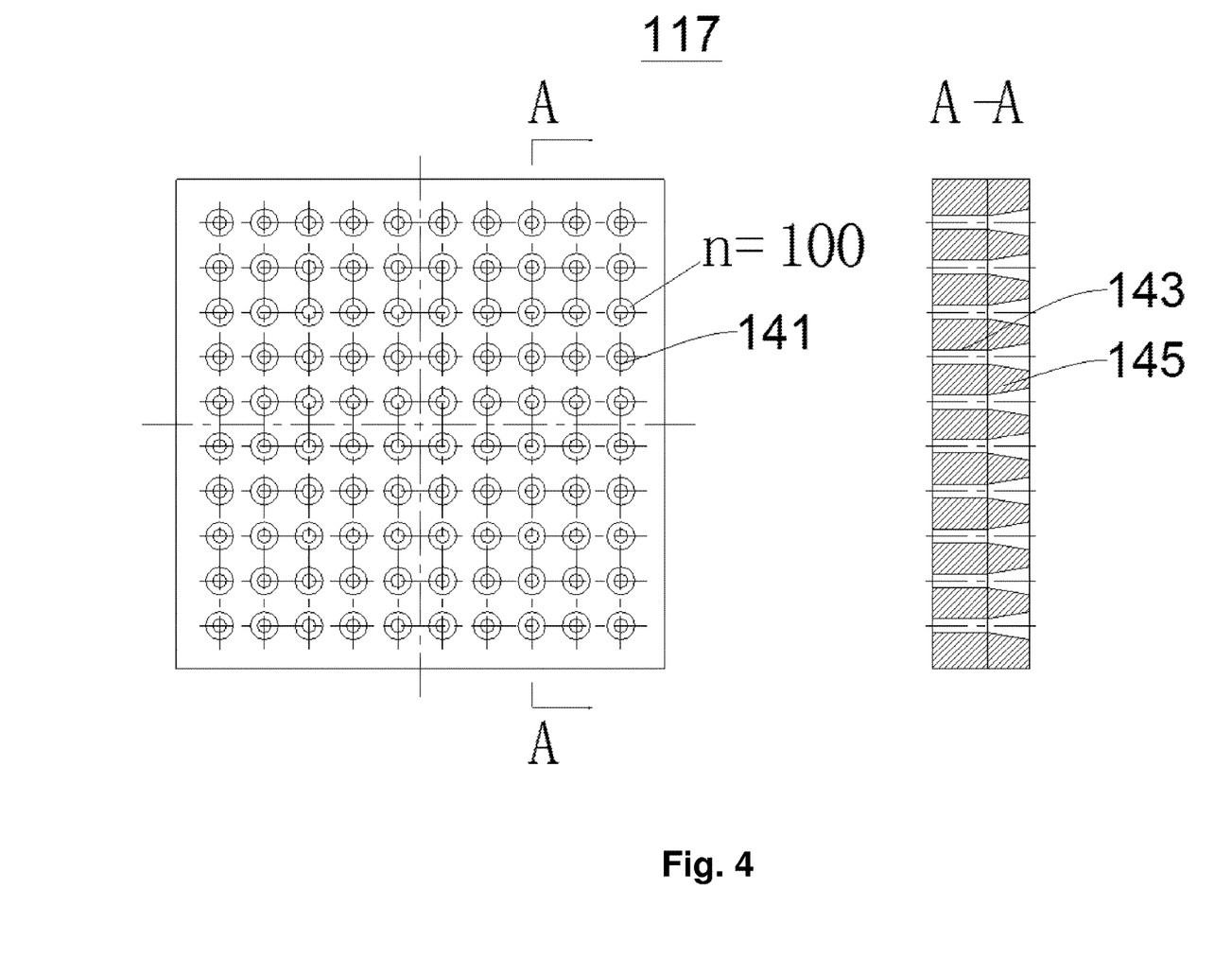
FIG. 4 is a structural schematic diagram of an ordered porous plate provided in an embodiment of the present disclosure.

FIG. 4 is a structural schematic diagram of an ordered porous plate 117 provided in the present embodiment. Referring to FIG. 1 to FIG. 4, in the present embodiment, the ordered porous plate 117 functions to further distribute air, and meanwhile prevent occurrence of backfire after the small-pore foamed ceramic plate 119 being combusted out. The ordered porous plate 117 is a light-weight high-strength cast plate having a plurality of through holes 141 uniformly distributed at intervals. Each through hole 141 has a first section hole 143 and a second section hole 145. The first section hole 143 is provided close to the mixed gas distributing plate 115, and the first section hole 143 is a straight-through hole. The second section hole 145, with a gradually increasing diameter, is a divergent hole. Such design not only can ensure uniform distribution of the mixed gas entering the small-pore-size porous medium, but also can effectively avoid occurrence of backfire after the small-pore-size porous medium is damaged.

Meanwhile, it should be indicated that in the present embodiment, the porous medium material is aluminum oxide, silicon carbide or zirconium oxide. The porous medium material is a porous foamed ceramic, with a spatial structure of opening or partially opening structure in a net shape or other shapes. Actually, uniformly distributed pores and particle shape almost do not exist due to complexity and randomness of the spatial structure thereof. The ceramic plate has a pore equivalent diameter of about 0.4~5 mm, a porosity of about 0.6~0.9, and number of pores in the range of 10~60 PPI (number of small pores per inch). The foamed ceramic is a special porous medium, with small density, high strength, good air permeability, heat resistance, wear resistance, and corrosion resistance, a heat conductivity coefficient smaller than that of metal materials but much larger than that of gases, thermal capacity and thermal radiation capability thousands of times larger than that of gases. The foamed ceramic is a better combustion field than a free space, and a combustion chamber made of such material not only can meet requirement of thermal insulation, but also can ensure good thermal exchange effect, and can achieve stable combustion of low-calorific-value gases. According to an inlet direction of the mixed gas, an upstream foamed ceramic plate with small pores and a downstream foamed ceramic plate with big pores are divided.

In the above, particularly in the present embodiment, the big-pore foamed ceramic plate 121 is a composite corundum porous medium plate, and the big-pore foamed ceramic plate 121 has the number of pores of 60 PPI and the porosity of 0.85. The small-pore foamed ceramic plate 119 is a silicon carbide porous medium plate, and the small-pore foamed ceramic plate 119 has the number of pores of 10 PPI and the porosity of 0.85. The small-pore foamed ceramic plate 119 has a pore size smaller than a critical combustion diameter, effectively preventing backfire and acting as a preheating zone. The big-pore foamed ceramic plate 121 has a relatively large specific surface area and a pore diameter larger than a critical combustion diameter, and acts as a combustion zone. Of course, in other embodiments of the present disclosure, the number of pores and the porosity of the big-pore foamed plate and the small-pore foamed plate may be selected according to requirements, and no limitation is made in the embodiments of the present disclosure.

Meanwhile, as a preferred solution, in the present embodiment, the three, i.e. the big-pore foamed ceramic plate 121, the small-pore foamed ceramic plate 119, and the ordered porous plate 117 are extruded to be tightly attached together, without any gaps being left around, and a space between each of them and the inner wall of the square chamber being filled with silica wool. A part of the cavity is left between the ordered porous plate 117 and the mixed gas distributing plate 115 for further mixing air and the fuel gas.

It should be indicated that in the present embodiment, in order to conveniently replace damaged parts such as the foamed ceramic plates and the ordered porous plate 117, the entirety is formed by connecting various parts through bolts, thus facilitating detachment and reassembling of the various parts. The outer burner block 109 of the combustor has an outer wall in a regular geometrical shape, facilitating insertion into a hole of a furnace wall, and bolted connection to the furnace wall through a threaded hole of the casing 107. The ignition electrode 125 is inserted at an outlet end face close to the foamed ceramic plate through a hole inclined downwards inside an outer furnace lining. The detecting electrode 127 is inserted at a right end face of the furnace lining through a horizontal hole inside the outer furnace lining. Then the big-pore foamed ceramic plate 121, the small-pore foamed ceramic plate 119, and the ordered porous plate 117 are sequentially placed in the inner chamber of the burner block, with a space with the inner wall being filled with silica wool. The mixed gas distributing plate 115 is threaded-connected onto the four steel brackets welded in the bottom portion of the inner burner block 111. The inner burner block 111 is embedded into the square chamber of the outer burner block 109, and then the casing 107 in the bottom portion and the outer burner block 109 are connected through bolts. The thermocouple 123 is inserted into the square chamber of the inner furnace lining through a horizontal furnace wall via hole, for detecting a temperature of the mixed gas inside before entering the ordered porous plate 117. Outside the combustor, the air-fuel gas mixer is fixedly connected to the via hole in the bottom portion of the inner burner block 111 through the coal gas pipe 113.

Meanwhile, air and the fuel gas flow in one direction, pass through the air-fuel gas mixer, the coal gas pipe 113, the via hole of the inner burner block 111, the mixed gas distributing plate 115, the ordered porous plate 117, the small-pore foamed ceramic plate 119, and the big-pore foamed ceramic plate 121 in turns, and finally are ignited by the ignition electrode 125 at the big-pore foamed ceramic plate 121. Air and the fuel gas required by the combustion, of which flow rates are adjusted by flow control valve, enter the air-fuel gas mixer according to certain proportions. Air and the coal gas are uniformly premixed in the mixer. After mixing, the premixed gas passes through the internal furnace lining and the via hole of the casing 107, is blocked by the mixed gas distributing plate 115 at a terminal end of the via hole and guided to be diffused in the cavity all around, and is uniformly distributed inside the cavity. The premixed gas is further subjected to air distribution through the ordered porous plate 117, then enters the small-pore foamed ceramic plate 119 to be preheated, and is combusted inside the big-pore foamed ceramic plate 121.

To sum up, the porous medium premixing combustor 100 provided can achieve efficient and clean combustion of the fuel, and be adapted to combustion of gases with different calorific values, and meanwhile can effectively prevent backfire, facilitate flame monitoring, predict and monitor use status of the porous medium material in real time, and have a function of effectively monitoring combustion conditions in a situation of preheating air-fuel gas and so on.

The above-mentioned are merely for preferred embodiments of the present disclosure and not intended to limit the present disclosure. For one skilled in the art, various modifications and variations may be made to the present disclosure. Any amendments, equivalent replacements, improvements, and so on, within the spirit and principle of the present disclosure, should be covered by the scope of protection of the present disclosure.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

What is claimed is:

1. A porous medium premixing combustor, comprising:
an air-fuel gas mixer having an air inlet and a coal gas inlet;
a combustor body, wherein the combustor body comprises a casing, an outer burner block, and an inner burner block, the casing is connected to the air-fuel gas mixer through a pipe, the outer burner block and the casing are fixedly connected, and form a square chamber; the inner burner block is provided inside the square chamber and fixedly connected to the casing, the inner burner block has a via hole communicating with the pipe; the combustor body further comprises a mixed gas distributing plate, an ordered porous plate, a small-pore foamed ceramic plate, and a big-pore foamed ceramic plate sequentially provided inside the square chamber of the outer burner block along an axis direction of the via hole of the inner burner block;
a thermocouple provided at the casing, wherein one end of the thermocouple extends into the square chamber and the thermocouple is configured for monitoring a temperature of the mixed gas before entering the ordered porous plate;
an ignition electrode, provided close to one end of the big-pore foamed ceramic plate through an inclined hole of the outer burner block, and configured to ignite air and fuel gas at an end face of the big-pore foamed ceramic plate; and
a detecting electrode, inserted in an exit end of the big-pore foamed ceramic plate through a horizontal hole of the outer burner block, and configured to detect an electric ion signal of a flame.

2. The porous medium premixing combustor according to claim 1,
wherein the outer burner block comprises a first block body formed by casting a light-weight refractory castable material and a first steel outer housing, the first block body is fixed to the first steel outer housing through an anchor nail, and the first steel outer housing covers a bottom wall and a part of an outer wall of the first block body.

3. The porous medium premixing combustor according to claim 1,
wherein the inner burner block comprises an internal second block body formed by casting a light-weight high-strength castable material and an outer second steel outer housing, the second block body is fixed to the second steel outer housing through an anchor nail, and the second steel outer housing covers a bottom wall and a part of an outer wall of the second block body.

4. The porous medium premixing combustor according to claim 1,
wherein the mixed gas distributing plate comprises a guiding cone and a baffle, the baffle is mounted to the inner burner block through the brackets, a center line of the baffle overlaps an axis of the via hole, and the guiding cone is welded to a center of the baffle.

5. The porous medium premixing combustor according to claim 4,
wherein the baffle is a steel plate, and the guiding cone is formed by rolling a steel plate.

6. The porous medium premixing combustor according to claim 1,
wherein the ordered porous plate is a light-weight high-strength cast plate having a plurality of through holes uniformly distributed at intervals, each through hole has a first section hole and a second section hole, the first section hole is provided close to the mixed gas distributing plate, and the first section hole is a straight-through hole, and the second section hole, with a gradually increasing diameter, is a divergent hole.

7. The porous medium premixing combustor according to claim 1,
wherein the small-pore foamed ceramic plate and the big-pore foamed ceramic plate have a pore equivalent diameter of 0.4~5 mm, a porosity of 0.6~0.9, and the number of pores in the range of 10~60 PPI, and pores of the big-pore foamed ceramic plate are larger than pores of the small-pore foamed ceramic plate.

8. The porous medium premixing combustor according to claim 7,
wherein the big-pore foamed ceramic plate is a composite corundum or silicon carbide or zirconium oxide porous medium plate, and the big-pore foamed ceramic plate has the number of pores of 10~50 PPI and the porosity of 0.6~0.9; the small-pore foamed ceramic plate is a composite corundum or silicon carbide or zirconium oxide porous medium plate, and the small-pore foamed ceramic plate has the number of pores not less than 50 PPI and the porosity of 0.6~0.9.

9. The porous medium premixing combustor according to claim 1,
wherein the outer burner block and a furnace wall, the outer burner block and the inner burner block, and the inner burner block and the air-fuel gas mixer are in bolted connection therebetween, respectively, facilitating detaching and replacing a porous medium material.

10. The porous medium premixing combustor according to claim 1,
wherein the ordered porous plate, the small-pore foamed ceramic plate, and the big-pore foamed ceramic plate are tightly attached together, and a space between each of them and an inner wall of the square chamber is filled with silica wool.

* * * * *